UNITED STATES PATENT OFFICE.

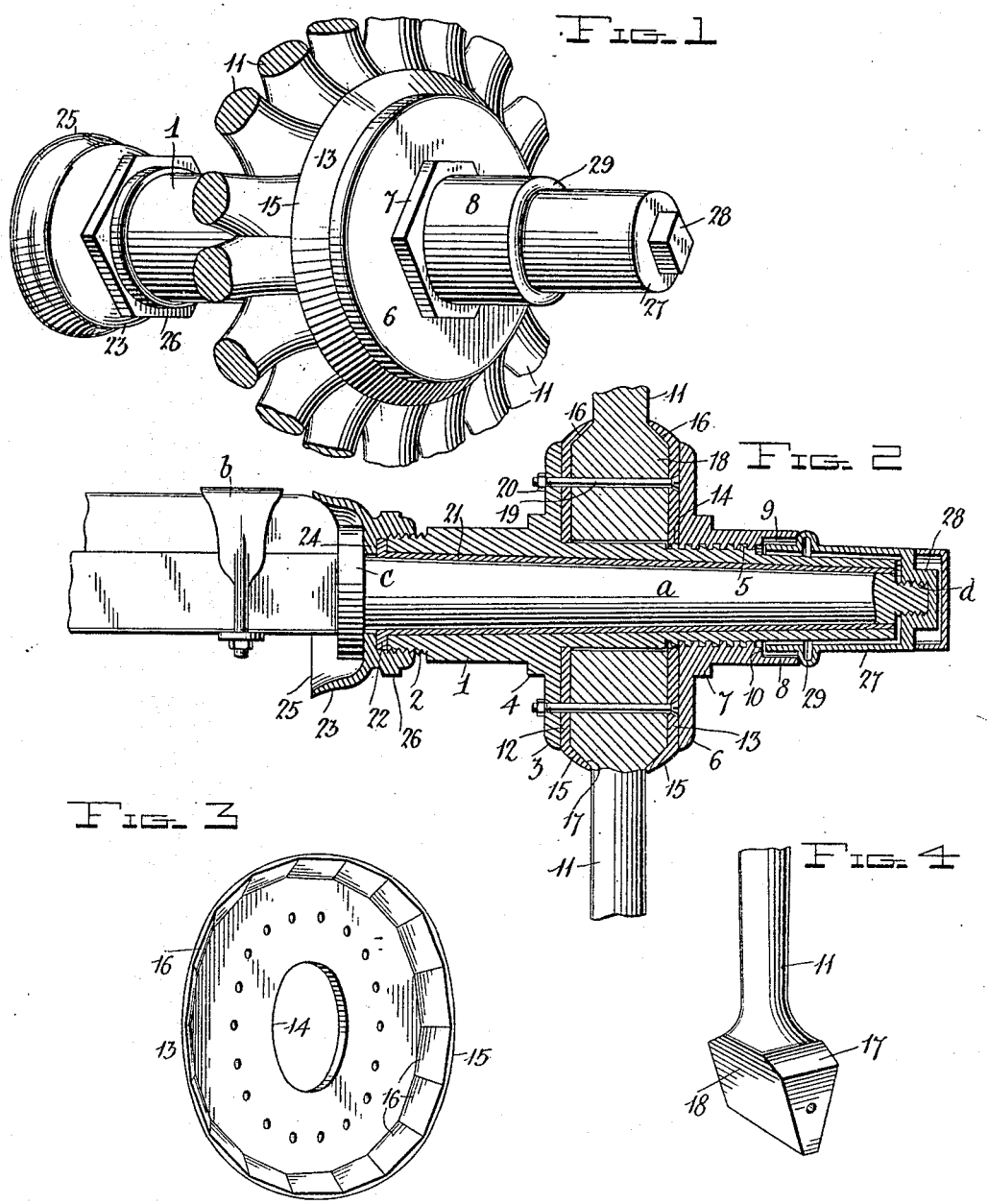

MARTIN LUTHER PORTER, OF REDDING, CALIFORNIA.

VEHICLE-WHEEL.

No. 880,915.  Specification of Letters Patent.  Patented March 3, 1908.

Application filed April 22, 1907. Serial No. 369,666.

*To all whom it may concern:*

Be it known that I, MARTIN LUTHER PORTER, a citizen of the United States, residing at Redding, in the county of Shasta and State of California, have invented certain new and useful Improvements in Vehicle-Wheels; and I do declare the following to be a full, clear, and exact description of the invention, such as will enable others skilled in the art to which it appertains to make and use the same.

My invention relates to improvements in vehicle wheels and more particularly to the hubs and boxings thereof, and the means for securing the spokes in the hubs.

The object of the invention is to provide a simple, durable, and comparatively inexpensive wheel hub in which the spokes are firmly secured, and in which they may be quickly replaced when broken; a further object being to effect improvements in the construction of the box and the box retainer and the spokes whereby a worn box may be removed and replaced by even an unskilled person without damage to the wheel.

With the above and other objects in view, the invention consists in the construction, combination and arrangement of devices hereinafter described and claimed.

In the accompanying drawings,—Figure 1 is a perspective view of the hub of the vehicle wheel constructed in accordance with my invention; Fig. 2 is a longitudinal sectional view through the same; Fig. 3 is a perspective view of one of the clamping collars, and Fig. 4 is a perspective view of the inner end of one of the spokes.

The spindle of an ordinary axle is indicated at $a$, the clip at $b$, and the axle collar at $c$. The usual thread $d$ is on the reduced outer end of the spindle.

My improved vehicle wheel hub has a bearing sleeve 1, which is preferably a steel casting, and is provided at its inner end with an exteriorly screw-threaded portion 2. At a suitable distance from the inner end of said bearing sleeve is an annular stop flange or collar 3, on the outer face of which is a polygonal surface 4, which is adapted to be engaged by a wrench or like device when the parts of the hub are being secured together or separated. At a suitable distance from the outer end of the said bearing sleeve is an exteriorly screw-threaded portion 5. A clamping nut 6 is adapted to be screwed on the said portion 5 and is provided on its outer face with a polygonal surface 7 adapted to be engaged by a wrench or like device, and operated thereby for turning said nut; and the said nut is further provided on its outer side with a tubular portion 8 which has an annular recess 9 on its inner side at its outer end, forming an annular shoulder 10.

The spokes 11 of the wheel are adapted to be removably clamped between two clamping disks or plates 12, 13, which are placed upon the bearing sleeve between the collar 3 thereof and the nut 6. Each of these disks or plates is formed with a central opening 14 to receive the bearing sleeve, and with an outwardly extending annular flange or rim 15, so that each of said disks or plates is dished or of a concave form. The inner face of the flange or rim 15 consists of a plurality of flat faces 16, each of which corresponds in length and width with the length and width of shoulders 17 formed upon the opposite sides of the enlarged inner ends 18 of the spokes, which are of segmental form so that they fit against each other and in the flat inner faces of the two clamping plates or disks 12, 13. The extreme inner ends of the enlarged portions 18 of the spokes bear against the sleeve 1, and the shoulders 17 are engaged by the rims or flanges 15 so that the spokes are held firmly and secured in position. The said disks are clamped upon opposite sides of the enlarged inner ends of the spokes and are also secured to the collar 3 of the bearing sleeve 1, by means of clamping bolts 19, which have their heads countersunk in openings in the disk 13, and their inner ends passed through openings in the disk 12 in said collar 3, and provided with nuts 20.

The boxing 21 which fits in the bore of the hub sleeve 1 and revolves on the spindle $a$, is provided at its inner end with an annular outwardly extending shoulder 22, which bears against the inner end of the said hub sleeve. A box retainer and dirt excluder 23 is interiorly screw-threaded at its outer end to enable it to be secured on the threaded portion 2 of the inner end of the hub sleeve so that it may be detachably secured to the hub sleeve, and is provided with an inwardly extending annular flange 24 to bear against the inner end of the boxing to retain the latter in place, and to also bear against the collar $c$ of the axle and the said box retainer and dirt excluder is formed on its inner side with a bell-shaped flange 25 which covers the collar c and covers the end of the wooden portion of the axle and serves to prevent dirt from reaching the spindle.

It will be understood that after having taken off the wheel from the spindle, the boxing can be readily removed from the hub sleeve and replaced by a new one, it being only necessary to unscrew the boxing retainer and dirt excluder from the inner end of the hub sleeve in order to release and permit the removal of the boxing. To enable the box retainer and dirt excluder to be readily turned by a wrench or the like implement, I provide the same with a polygonal shoulder 26.

The recess 9 at the outer end of the nut 6 receives the inner end of a sleeve 27, provided upon a nut 28 which is screwed upon the threaded outer end $d$ of the spindle $a$. The said sleeve 27 is of less diameter than the interior diameter of the recessed portion 9 of the nut 6 and is formed with an annular bead or rib 29, which is adapted to close the outer end of the said recess 9. This construction prevents the entrance of dust and dirt between the hub sleeve and the nut 6, and hence between the boxing and the spindle.

Various changes in the form, proportion and the minor details of construction may be resorted to without departing from the principle or sacrificing any of the advantages of this invention.

Having thus described my invention, what I claim as new and desire to secure by Letters-Patent, is:—

1. A wheel hub having a sleeve, a box therein to bear on the axle spindle and provided with an annular, outwardly extending flange, and a box retainer, detachably secured to the inner end of the hub sleeve and having an inwardly extending annular flange to bear between the inner end of the box and the collar of the axle spindle.

2. A wheel hub having a sleeve, a box therein to bear on the axle spindle and provided at its inner end with an annular outwardly extending flange, and a box retainer screwed to the inner end of the hub sleeve and having an inwardly extending annular flange to bear between the inner end of the box and the collar of the axle spindle.

3. In a vehicle wheel, a hub having a perforated fixed collar and a screw threaded portion adjacent thereto, an imperforate collar on said screw threaded portion, two clamping plates between said collars, perforated to register with the perforations in the fixed collar and the perforations in one plate being counter-sunk, spokes between said plates, and bolts through said spokes, plates and the stationary collar with their heads in said counter-sunk perforations, and the nuts on said bolts engaging with the stationary collar.

In testimony whereof I have hereunto set my hand in presence of two subscribing witnesses.

MARTIN LUTHER PORTER.

Witnesses:
GEORGE O. PERRY,
LOLA BIDWELL.